US007873624B2

(12) United States Patent
Agichtein et al.

(10) Patent No.: US 7,873,624 B2
(45) Date of Patent: Jan. 18, 2011

(54) QUESTION ANSWERING OVER STRUCTURED CONTENT ON THE WEB

(75) Inventors: Yevgeny E. Agichtein, Seattle, WA (US); Christopher J. Burges, Bellevue, WA (US); Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 279 days.

(21) Appl. No.: 11/256,503

(22) Filed: Oct. 21, 2005

(65) Prior Publication Data

US 2007/0094285 A1    Apr. 26, 2007

(51) Int. Cl.
*G06F 17/30* (2006.01)
(52) U.S. Cl. .................................... 707/708
(58) Field of Classification Search .............. 707/3, 707/101, 706, 708
See application file for complete search history.

(56) References Cited

U.S. PATENT DOCUMENTS

| | | | | |
|---|---|---|---|---|
| 5,418,948 A * | 5/1995 | Turtle | ............................ | 707/4 |
| 6,006,218 A * | 12/1999 | Breese et al. | .................. | 707/3 |
| 6,269,368 B1 * | 7/2001 | Diamond | ...................... | 707/6 |
| 6,665,666 B1 * | 12/2003 | Brown et al. | ................... | 707/5 |
| 7,085,755 B2 * | 8/2006 | Bluhm et al. | .................. | 707/3 |
| 2002/0129005 A1 * | 9/2002 | Ojanen | .......................... | 707/1 |
| 2004/0068486 A1 * | 4/2004 | Chidlovskii | .................... | 707/3 |
| 2004/0249808 A1 * | 12/2004 | Azzam et al. | ................... | 707/4 |
| 2005/0027687 A1 * | 2/2005 | Nowitz et al. | .................. | 707/3 |
| 2006/0173834 A1 * | 8/2006 | Brill et al. | ....................... | 707/4 |
| 2006/0235689 A1 * | 10/2006 | Sugihara et al. | ............. | 704/257 |

OTHER PUBLICATIONS

Lide Wu, Xuanjing Huang, Lan You, Zhushuo Zhang, Xin Li, and Yaqian Zhou. 2004. FDUQA on TREC2004 QA Track. In Proceedings of the Thirteenth Text REtrieval Conference (TREC 2004).*

E. Brill, J. Lin, M. Banko, S. Dumais and A. Ng. 2001. Data-Intensive Question Answering. In Proceedings of the Tenth Text Retrieval Conference (TREC 2001), Gaithersburg, MD, pp. 183-189.*

Embley et al., "Automatically Extracting Ontologically Specified Data from HTML Tables of Unknown Structure", 2002.*

Pinto et al., "QuASM: A System for Question Answering Using Semi-Structured Data", 2002, ACM, pp. 46-55.*

(Continued)

*Primary Examiner*—James Trujillo
*Assistant Examiner*—Dawaune Conyers
(74) *Attorney, Agent, or Firm*—Lee & Hayes, PLLC

(57) ABSTRACT

Structured content and associated metadata from the Web are leveraged to provide specific answer string responses to user questions. The structured content can also be indexed at crawl-time to facilitate searching of the content at search-time. Ranking techniques can also be employed to facilitate in providing an optimum answer string and/or a top K list of answer strings for a query. Ranking can be based on trainable algorithms that utilize feature vectors for candidate answer strings. In one instance, at crawl-time, structured content is indexed and automatically associated with metadata relating to the structured content and the source web page. At search-time, candidate indexed structured content is then utilized to extract an appropriate answer string in response to a user query.

18 Claims, 12 Drawing Sheets

OTHER PUBLICATIONS

Pinto et al.,"Table Extraction Using Conditional Random Fields", 2003, ACM, pp. 235-242.*

Neumann et al.,"Mining Natural Language Answers from the Web", 2004, ACM, pp. 123-135.*

Cai et al.,"Extracting Content Structure for Web Pages Based on Visual Representation", 2003, Springer-Verlag Berlin Heidelberg, pp. 406-417.*

E. Agichtein, et al., Snowball: Extracting Relations From Large Plain-Text Collections. In Proceedings of the 5th ACM International Conference on Digital Libraries, Jun. 2000.

E. Brill, et al., An Analysis of the AskMSR Question-Answering System. In EMNLP, 2002.

S. Buchholz, Using Grammatical Relations, Answer Frequencies and the World Wide Web for Trec Question Answering. In TREC, 2001.

C. Burges, et al., Learning to Rank Using Gradient Descent. In Proceedings of the Twenty Second International Conference on Machine Learning, Bonn, Germany, 2005.

R. Caruana, et al., Using the Future to "Sort Out" the Present: Rankprop and Multitask Learning for Medical Risk Evaluation. In D. S. Touretzky, M. C. ozer, and M. E. Hasselmo, editors, Advances in Neural Information Processing Systems, vol. 8, pp. 959-965. The MIT Press, 1996.

J. Caverlee, et al., Probe, Cluster, and Discover: Focused Extraction of QA-Pagelets From the Deep Web. In Proceedings of ICDE, 2004.

K. C.-C. Chang, et al., Toward Large Scale Integration: Building a MetaQuerier Over Databases on the Web. In Proceedings of the Second Conference on Innovative Data Systems Research (CIDR 2005), 2005.

K. Crammer, et al., On the Algorithmic Implementation of Multiclass Kernel-Based Vector Machines. Journal of Machine Learning Research, 2:265-292, 2001.

A. Doan, et al., Semantic Integration Research in the Database Community: A Brief Survey. AI Magazine, Special Issue on Semantic Integration, 2005.

O. Etzioni, et al., Web-scale information extraction in knowitall. In WWW, 2004.

E. Harrington, Online Ranking/Collaborative Filtering Using the Perceptron Algorithm. In Proceedings of the Twentieth International Conference on Machine Learning, 2003.

W. Hildebrandt, et al., Answering Definition Questions With Multiple Knowledge Sources. In HLT/NAACL 2004, 2004.

V. Hristidis, et al., Efficient IR-Style Keyword Search Over Relational Databases. In VLDB, 2003.

C. C. T. Kwok, et al., Scaling Question Answering to the Web. In Proceedings of the 10thWorldWide Web Conference (WWW-10), 2001.

G. Ramakrishnan, et al., Is Question Answering an Acquired Skill? in WWW, 2004.

E. M. Voorhees, Overview of the TREC 2003 Question Answering Track. In Text REtrieval Conference, 2004.

Agichtein, et al. Learning to Find Answers to Questions on the Web. In: ACM Transactions on Internet Technology, vol. 4, No. 2, May 2004, pp. 129-162. http://delivery.acm.org/10.1145/1000000/990303/p129-agichtein.pdf?key1=990303&key2=8208815221&coll=GUIDE&dl=GUIDE&CFID=8355246&CFTOKEN=26669024. Last accessed Oct. 28, 2008, 34 pages.

Mitchell, T. M., Machine Learning, McGraw-Hill, New York, 1997, pp. 154-198.

* cited by examiner

QUESTION ANSWERING OVER STRUCTURED CONTENT ON THE WEB

BACKGROUND

Typically, the information available from the Internet is found via web sites and servers and is accessed via a web browser executing on a web client (e.g., a computer). For example, a web user can deploy a web browser and access a web site by entering the web site Uniform Resource Locator (URL) into an address bar of a web browser and pressing the enter key on a keyboard or clicking a "go" button with a mouse. The URL typically includes three pieces of information that facilitate access: a protocol (set of rules and standards for the exchange of information in computer communication) string, a domain name (often based on the name of an organization that maintains the web site), and a path to the desired document on that site. In some instances, the user knows, a priori, the name of the site or server, and/or the URL to the site or server that the user desires to access. In such situations, the user can access the site, as described above, via entering the URL in the address bar and connecting to the site. However, in most instances, the user does not know the URL or the site name. Instead, the user employs a search function to facilitate locating information based on keywords provided by the user.

The user can enter keywords into a general search engine, which will search the World Wide Web and return sites that it determines to be related to the keywords. Often, however, the general search engine will return sites that are wholly unrelated to the particular interests of the user. The user is forced to scroll through the returned sites and attempt to determine if they are related to their interests. This scrolling task, however, can be extremely time-consuming and frustrating to the user because a substantial number of sites can be returned when performing a search. The user can attempt to narrow the search via utilizing a combination of Boolean operators, but it can be difficult to construct an appropriate Boolean search that will result in a return of sites containing relevant information.

As difficult as searching for relevant websites can be, users, however, typically prefer to find information directly in response to a search query rather than searching for and reviewing a list of websites. For example, a user might ask "how long did the War of 1812 last?" A typical search engine will return a list of URLs/search results, with associated text snippets describing the document but not containing an explicit answer for the question. It is generally left up to the user to visit each result to find the answer to their question. This is often frustrating for users who are looking for a direct response to their queries. Most users do not have the time to visit each result hoping to obtain the correct answer. The Internet contains an enormous amount of valuable information, but its value can be increased even more by providing easy and quick answers to user questions.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to search engines, and more particularly to systems and methods for answering questions utilizing structured content found on the Web. The structured content and associated metadata are leveraged to provide specific answer string responses to user questions. The structured content can also be indexed to facilitate searching of the content. Ranking techniques can also be employed to facilitate in providing an optimum answer string and/or a top K list of answer strings for a query. Ranking can be based on trainable algorithms that utilize feature vectors on candidate answer strings. For example, in one instance, at crawl-time, structured content is indexed and automatically associated with metadata relating to the structured content and the source web page. At search-time, candidate indexed structured content is then utilized to extract an appropriate answer string in response to a user query. This significantly improves both efficiency and accuracy of web question answering.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
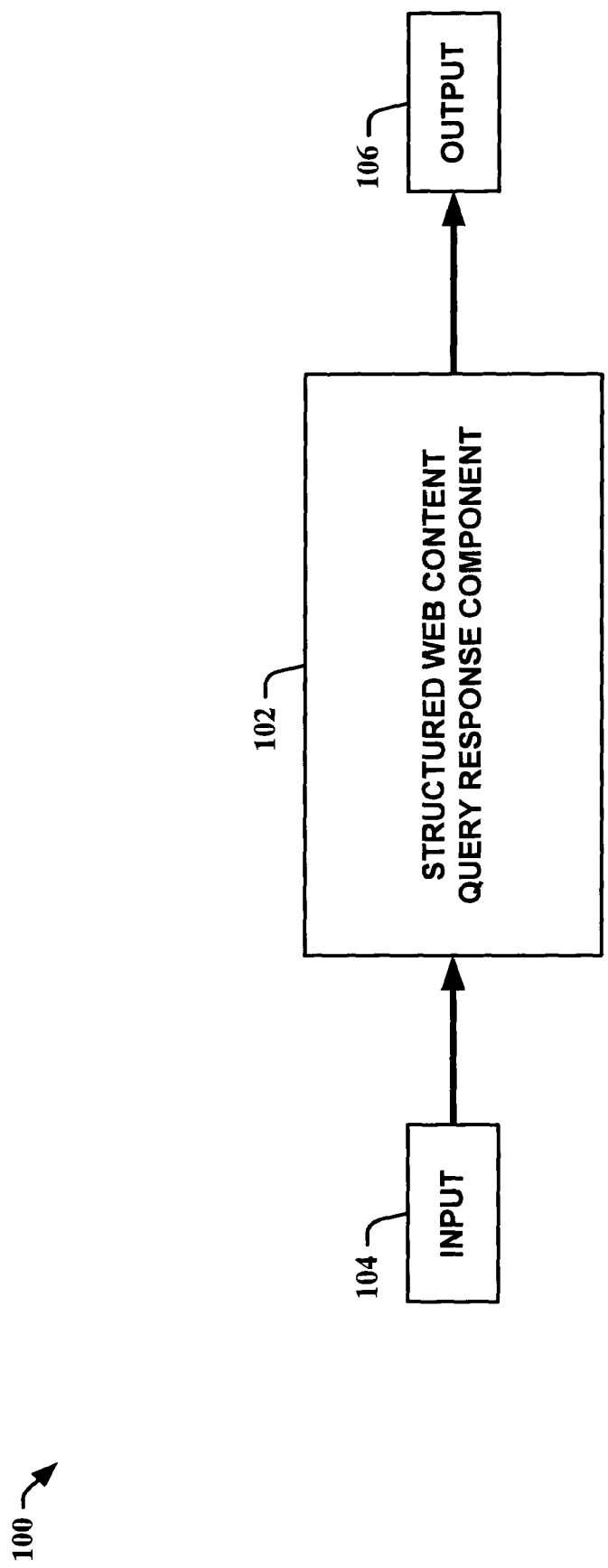
FIG. 1 is a block diagram of a structured web content query response system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Systems and methods are provided that perform question answering for queries by examining structured content on the Web. A framework is utilized in which at crawl-time the structured content can be, for example, separately indexed and automatically associated with keywords to describe the structured content and its source. At search-time, instead of performing a web search, the indexed candidate structured content, not documents, is examined, and the answer is extracted from the structure of the content. By performing annotation and additional specialized indexing for structured content on the Web at crawl-time, the framework can significantly improve both efficiency and accuracy of web question answering.

In FIG. 1, a block diagram of a structured web content query response system 100 in accordance with an aspect of an embodiment is shown. The structured web content query response system 100 is comprised of a structured web content query response component 102 that receives an input 104 and provides an output 106. The input 104 is generally comprised of implicit structured content from the Web such as, for example, implicit tables and/or lists and the like from a web page and metadata associated with the structured content. The structured content generally provides relationships between strings of information that can be exploited.

The metadata can include, but is not limited to, textual information, graphical information, structured content structural information, source structural information, network information, and/or source metadata and the like. For example, it can include surrounding text on a web page, web page title, and/or URL of an originating web page of structured content and the like. It can also include, but is not limited to, network associated information relating to the web page (e.g., location of the web page, links to the web page, ranking of the web page, access data relating to the web page, etc.); anchor, header, and/or footer information for a structured content source; header and/or footer information for structured content; and/or other related information associated with the structured content and/or its originating source and the like. Other types of information for the metadata can also include, but are not limited to, highlights, colors, structure of the Web, structure of the structured content (e.g., number of rows and/or columns of a table, etc.), spatial information, and/or graphical items/structures and the like.

The structured web content query response component 102 employs the input 104 to facilitate in determining a query response for a given user query question. The output 106 is generally an answer string that is responsive to the user query question. The structured web content query response component 102 can operate in a scalable manner to determine an answer string from a substantially large amount of input 104. For example, the input 104 can be comprised of millions of web pages and, possibly, billions of tables and/or lists (i.e., structured content) and the like. The structured web content query response component 102 can operate in real-time by employing the input 104 directly in response to a user query question and/or employ structured content indexing techniques at crawl-time that store the indexed structured content so that it can be retrieved at search-time. This affords great flexibility in the utilization of the structured web content query response system 100.

Other instances of the structured web content query response component 102 (see, infra) provide a ranking process that facilitates in providing a top K list of answer strings in response to a question, where K is an integer from one to infinity. The ranking process is trainable based on features of answer strings derived from the structured content and can also be trained on data such as, for example, user input data, personalized user data, system data, localized data, task specific data, and/or user profession data and the like. In fact, such data can be uploaded to a local and/or remote central data server to facilitate dissemination of the information. This flexibility allows the structured web content query response system 100 to be enhanced through specific training for various conditions, locations, and/or users and the like. The structured web content query response system 100 can also be employed in conjunction with more traditional question answering systems to allow additional flexibility depending on data availability and/or access and the like.

Figure 2:
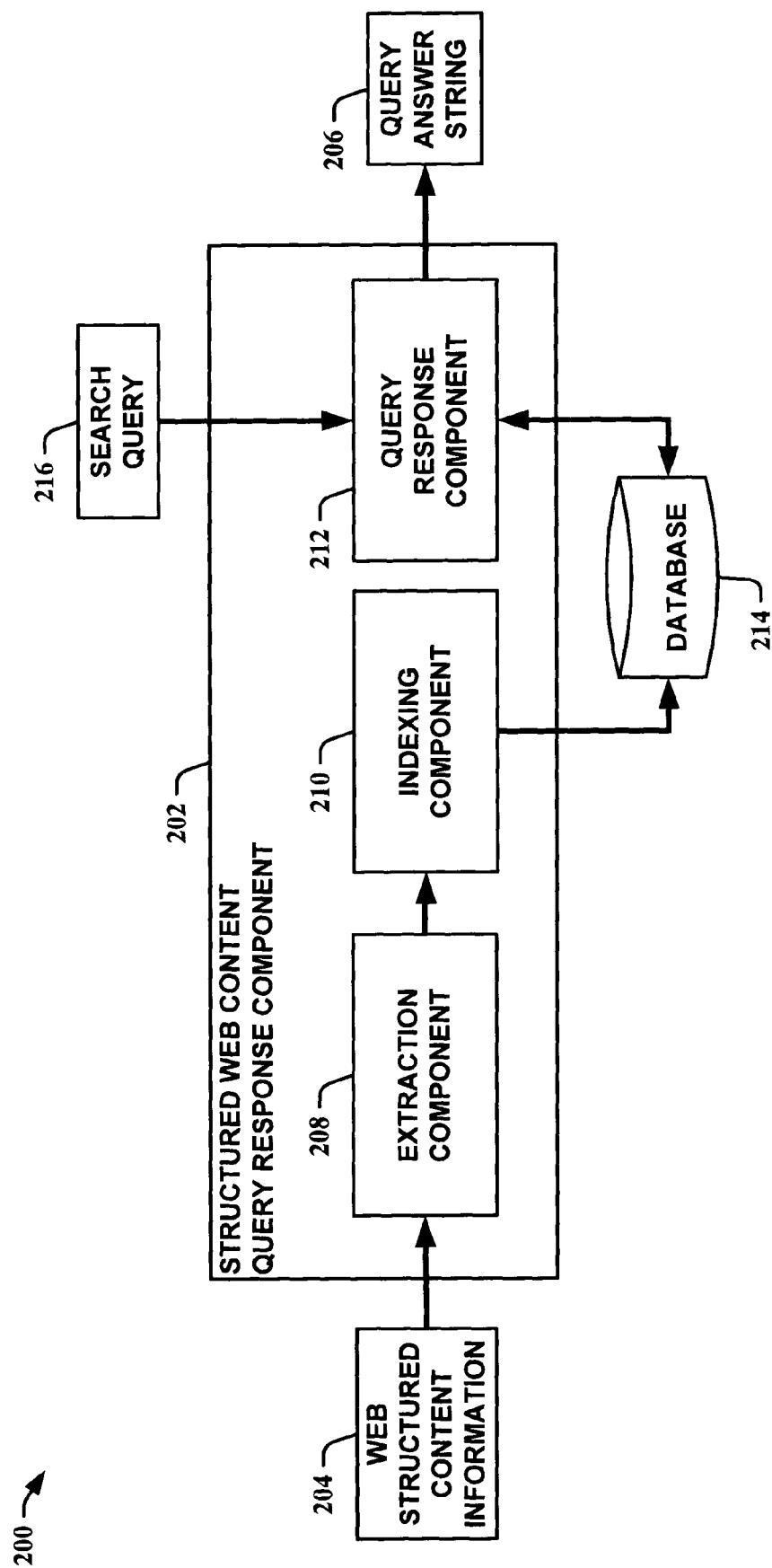
FIG. 2 is another block diagram of a structured web content query response system in accordance with an aspect of an embodiment.

Turning to FIG. 2, another block diagram of a structured web content query response system 200 in accordance with an aspect of an embodiment is depicted. The structured web content query response system 200 is comprised of a structured web content query response component 202 that receives web structured content information 204 and provides a query answer string 206. The structured web content query response component 202 is comprised of an extraction component 208, an indexing component 210, and a query response component 212. The web structured content information 204 is generally comprised of structured content and its associated metadata.

The extraction component 208 obtains the web structured content information 204 from the Web. The indexing component 210 then receives the web structured content information 204 from the extraction component 208 and indexes it utilizing the metadata. In typical instances, the indexed structured content is then stored in a searchable database 214. The extraction component 208 and the indexing component 210 typically run at crawl-time. The query response component 212 receives a search query 216 and searches the indexed structured content stored in the database 214 to find relevant content structures that contain answer strings that are responsive to the search query 216. A query answer string 206 is then derived utilizing feature information associated with the answer and a ranking process. Some instances provide a top K answer string list as discussed in more detail infra. The query response component 212 typically operates at search-time. It is also possible for the query response component 212 to directly receive non-indexed structured content and associated metadata from the extraction component 208 (instead of and/or in conjunction with the database 214) when it (208) is operational at search-time rather than at crawl-time.

Figure 3:
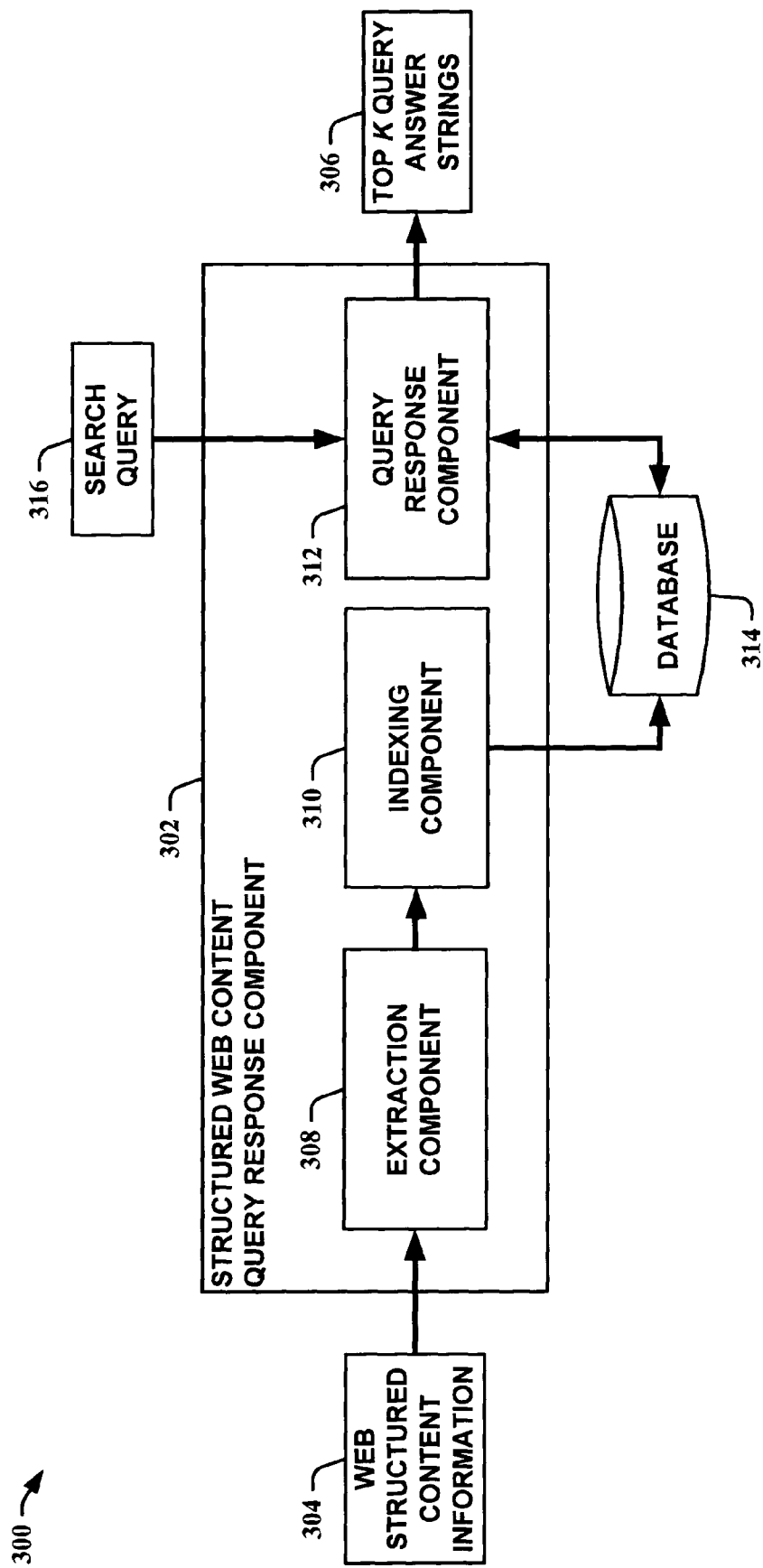
FIG. 3 is yet another block diagram of a structured web content query response system in accordance with an aspect of an embodiment.

Looking at FIG. 3, yet another block diagram of a structured web content query response system 300 in accordance with an aspect of an embodiment is illustrated. The structured web content query response system 300 is comprised of a structured web content query response component 302 that receives web structured content information 304 and provides top K query answer strings 306. The structured web content query response component 302 is comprised of an extraction component 308, an indexing component 310, and a query response component 312.

In this instance, the extraction component 308 operates at crawl-time and obtains web structured content information 304 from the Web. The indexing component 310 then indexes the web structured content information 304 utilizing associated metadata and stores the indexed information in a database 314. For example, if the web structured content information 304 contains table information, table metadata such as, for example, header, footer, surrounding text, page source, and/or internal table structure (e.g., number of rows and columns and the like) information and the like can be utilized during the indexing process. The processing of the web structured content information 304 is discussed in detail in an example instance infra. At search time, the query response component 312 receives a search query 316 and employs the database (i.e., the indexed web tables) 314 to derive top K query answer strings 306 via utilization of a ranking process. Additional processing (described infra) is employed to reduce the indexed web structured content information 304 and answer strings. Features of the answer are then employed to rank the candidate answer strings into the top K query answer strings 306.

Figure 4:
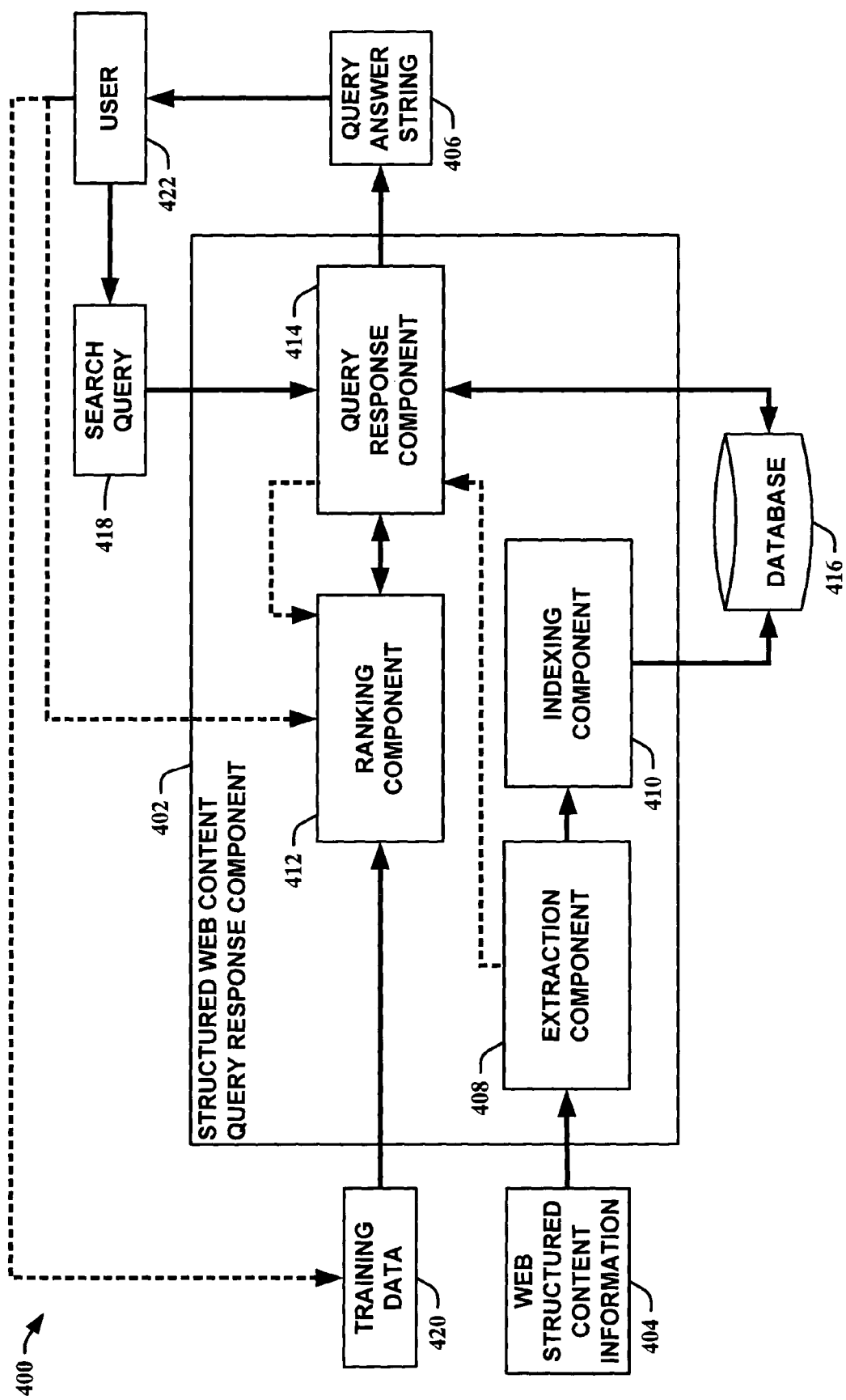
FIG. 4 is still yet another block diagram of a structured web content query response system in accordance with an aspect of an embodiment.

Moving on to FIG. 4, still yet another block diagram of a structured web content query response system 400 in accordance with an aspect of an embodiment is shown. The structured web content query response system 400 is comprised of a structured web content query response component 402 that receives training data 420 and/or web structured content information 404 and provides a query answer string 406. The web structured content information 404 is comprised of structured content from the Web and its associated metadata. The query answer string 406 can be comprised of a single answer string or multiple answer strings. The structured web content query response component 402 is comprised of an extraction component 408, an indexing component 410, a ranking component 412, and a query response component 414.

In this example, the extraction component 408 obtains the web structured content information 404 from the Web during crawl-time. The indexing component 410 receives the web structured content information 404 from the extraction component 408 and indexes the structured content and stores it in a database 416. At search-time, the query response component 414 receives a search query 418 from a user 422 and provides the query answer string 406 to the user 422 via employment of the indexed structured content stored in the database 416 (in an alternative instance, the query response component 414 can also receive the web structured content information 404 directly from the extraction component 408—denoted by an interconnecting dashed line that circumvents the indexing component 410).

The query response component 414 employs the ranking component 412 to facilitate in providing the query answer string 406. The ranking component 412 employs a trainable ranking process that incorporates training data 420 to enhance its 412 ranking abilities. The training data 420 can be comprised of, but is not limited to, manually labeled data, data from the user 422 (denoted by a dashed line from the user 422 and training data 420), localized data, and/or personalized data and the like. The ranking component 412 can also be influenced by direct inputs from the user 422 and/or the query response component 414 (denoted by dashed lines). For example, the user 422 can provide input on the number of answer strings to be provided, the type of answer strings to be provided, the question focus to be utilized, and/or other parameters that can affect the ranking process and the like. In a similar fashion, the query response component 414 can provide information to the ranking component 412 that can influence the ranking process as well (e.g., amount of available data—for example, small samples can substantially affect the ranking process, locality of the structured web content query response system 400, etc.). The query response component 414 can also provide feature information relating to answers and a feature set that candidate answer strings can be ranked over. The fact that substantially all aspects of the structured content can be utilized as a feature for utilization in the ranking process and that the ranking process is trainable, affords substantial flexibility in the employment and performance of the structured web content query response system 400.

Thus, the systems and methods provided herein typically extract promising structured content from the Web and index it with available metadata and/or network information related to the source of the structured content. More specifically, the structured content is associated with a set of keywords that appear in the metadata of the source web page. Additionally, by storing the network information associated with the source page, access to network metadata for the source page is also available. The structured content metadata information can be indexed as regular text keywords, and the actual structured content can be stored as a "non-indexed" text blob. Initially, a question is parsed and automatically annotated with a question target (e.g., "telegraph") and an answer type (e.g., "year"), and converted to a keyword query or multiple queries. The query is then submitted to a search engine over the metadata described above.

The question focus is searched for within the structured content returned by the search engine. Possibilities are parsed and candidate answer strings are extracted. The candidate answer strings are then filtered to match an answer type. For each surviving candidate answer, a feature vector is constructed that describes characteristics of an answer (e.g., the source quality, the closeness of match, frequency of the candidate and other characteristics of the answer) and the source content structure from which it was retrieved. The answer candidates can then be ranked according to a set of features, and, for example, the top K answers can be returned as the output of the overall system.

As an example application of the systems and methods herein, web page tables are utilized in this instance as a primary example of structured content. A substantial portion of the information needed to answer common user questions and queries has already been organized and structured in the millions of user-authored HTML (hyper-text markup language) tables. These tables have no associated schema and can have arbitrary formatting and presentation conventions. Yet, these tables were designed by the page authors to convey structured information to the readers by organizing the related information in table rows and columns.

Figure 5:
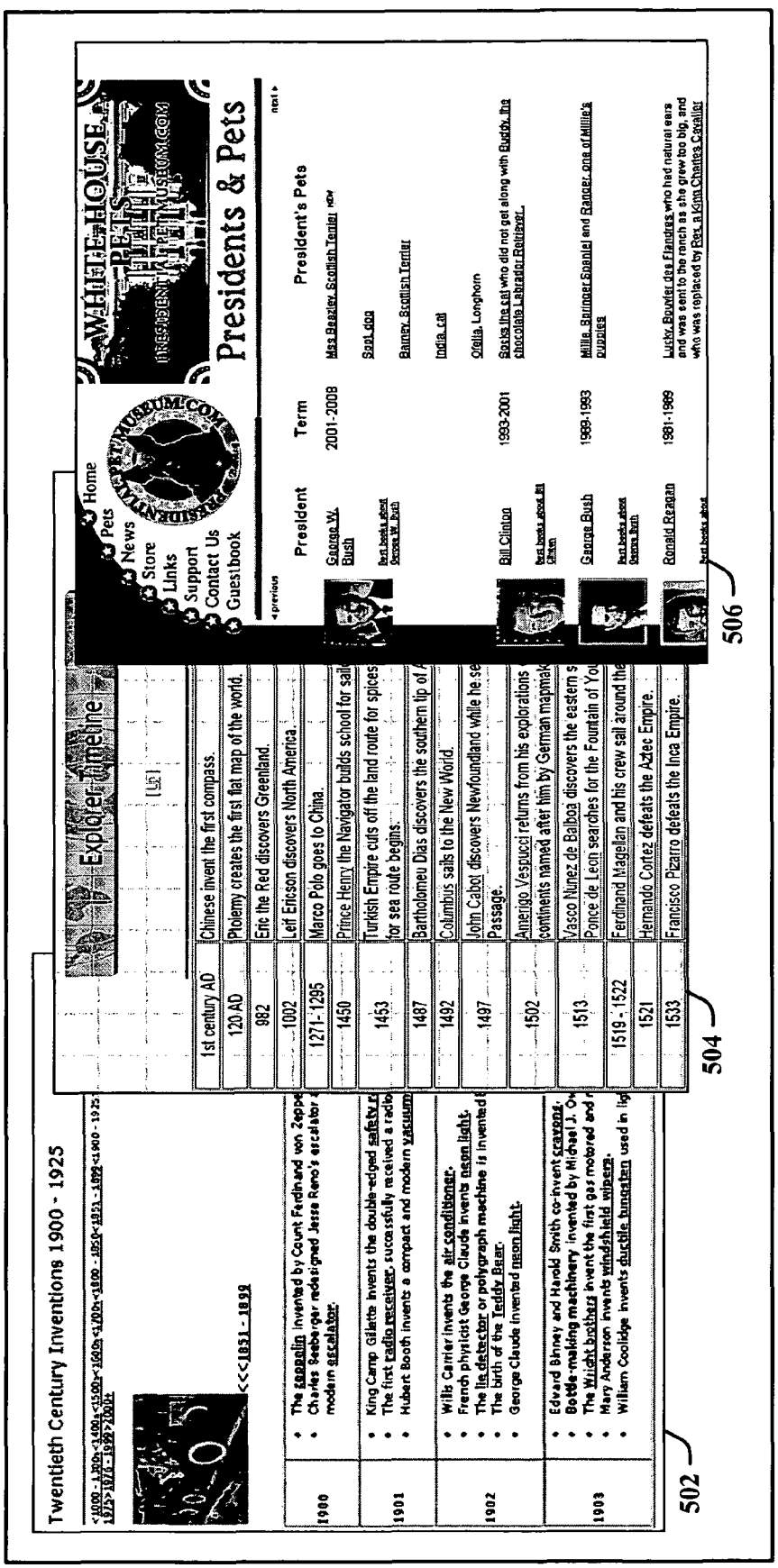
FIG. 5 is an illustration of examples of structured content on the Web in accordance with an aspect of an embodiment.

FIG. 5 is an illustration 500 of examples of structured content on the Web in accordance with an aspect of an embodiment. The illustration 500 shows three example table snippets: inventions timeline (inventors.about.com/library/weekly/aa121599a.htm) 502, explorer timeline (library.thinkquest.org/J002678F/timeline.htm) 504, and a table associating presidents with their pets (www.presidentialpetmuseum.com/whitehousepets-l.htm) 506. Note that two of these three typical table snippets 502, 504 do not provide column names, and none of the tables in the snippets 502-506 are structured in the strict sense: some of the table attributes are comprised of free text with embedded entities. Nevertheless, the layout provided by the page authors implies a relationship between the entities within the same row, and to lesser extent, the types of entities in the same column. Millions of such tables abound on the Web and encode valuable structured information about related entities. If properly preprocessed, indexed, and queried, these tables can be a rich source of information for question answering and web search, as many questions submitted by users to search engines are concerned with finding entities that are just so related.

A search engine can only do limited processing per query at run-time while maintaining low latency. Therefore, there is significant interest in preprocessing and interpreting the web page content at crawl time embodied by systems such as KnowItAll (see, O. Etzioni, M. Cafarella, D. Downey, S. Kok, A. M. Popescu, T. Shaked, S. Soderland, D. Weld, and A. Yates, Web-scale information extraction in knowitall, In *WWW*, 2004) and Snowball (see, E. Agichtein and L. Gravano, Snowball: Extracting relations from large plain-text collections, In *Proceedings of the 5th ACM International Conference on Digital Libraries*, June 2000). These systems target specific relationships that could later be used to answer only a limited set of question types. Unfortunately, this approach is not always adequate for general web search or open-domain question answering.

One of the reasons that web search is challenging is that queries in general, and questions in particular, exhibit a "heavy tail" behavior: it is commonly estimated that more than half of all queries submitted to search engines are asked only a few times. Hence, it is important to be able to answer questions about the non-commonly-queried relationships (e.g., president's pets) as well as about commonly queried relationships (e.g., about inventions).

In this respect, the presented techniques herein are complementary to the information extraction model and can facilitate with the "tail" questions. By relying on the existing structures on the Web, the question answering problem can often be reduced to the problem of finding an existing table that instantiates the required relationship. In many cases, even without doing sophisticated semantic extraction and interpretation, the answers from the rows and attribute values can be retrieved using the information already available on web page tables.

Unfortunately, HTML tables on the Web, as in the example snippets 502, 504 and 506 in FIG. 5, usually have very loose schema, if any, and, unlike the automatically-generated tables (e.g., web site book store records), have no standard conventions. Hence, traditional data integration and wrapper induction techniques are not directly applicable. Furthermore, the scale of the problem (more than 200 million tables in a single crawl sample, indicating billions of tables on the Web at large) makes traditional query processing and data integration techniques infeasible.

This lack of consistency, schema information, and the scale of the challenge has so far prevented efficient use of such surface tables for question answering, web search, and, more generally, for query processing. However, via employment of the systems and methods herein, exploitation of tables in web pages is indeed feasible and has substantial benefits for question answering, and more generally, to web search.

Traditional Approaches

Previous question answering and web search work largely ignored existing HTML tables and focused on either well-structured sources and online databases, or on natural language in pages. In the database field, the effort was largely focused on integrating and processing queries over well-structured sites and data sources. The systems and methods presented herein bridge the gap between the natural language and Question Answering (QA) field and the database/query processing field.

Question Answering is an established field that has long been dominated by heuristic and linguistic insights. Many of the state-of-the-art question answering systems have participated in the TREC QA competition (see, E. M. Voorhees, Overview of the TREC 2003 question answering track, In *Text REtrieval Conference*, 2004), and the best systems typically perform deep syntactic and semantic analysis that is not feasible for large-scale document collections such as the Web. Recently, there has been work on machine learning-based question answering systems (e.g., G. Ramakrishnan, S. Chakrabarti, D. Paranjpe, and P. Bhattacharyya, Is question answering an acquired skill? In *WWW*, 2004; C. C. T. Kwok, O. Etzioni, and D. S. Weld, Scaling question answering to the web, In *Proceedings of the 10thWorldWide Web Conference (WWW-10)*, 2001; and others). The FALCON question answering system presented in Ramakrishnan, Chakrabarti, Paranjpe, and Bhattacharyya 2004 discusses using "selectors" to retrieve answer passages from a given (small) unstructured text collection. In sharp contrast, the systems and methods herein facilitate in exploiting existent structure on the Web to retrieve actual answers to user's questions. In another approach, W. Hildebrandt, B. Katz, and J. Lin, Answering definition questions with multiple knowledge sources, In HLT/NAACL 2004, 2004 used a large number of dictionaries, or lists, some of which were constructed dynamically by querying sites such as online book retailers. Contrary to the approaches presented herein, the lists were extremely specific and were constructed for each question type.

Data integration on the Web is an active area of research in the database field (see generally, A. Doan and A. Halevy, Semantic integration research in the database community: A brief survey, *AI Magazine, Special Issue on Semantic Integration*, 2005). Another area of research is classifying and querying the structured databases on the hidden web (e.g., K. C.-C. Chang, B. He, and Z. Zhang, Toward large scale integration: Building a metaquerier over databases on the web, In *Proceedings of the Second Conference on Innovative Data Systems Research (CIDR 2005)*, 2005 and J. Caverlee, L. Liu, and D. Buttler, Probe, cluster, and discover: Focused extraction of qa-pagelets from the deep web, In *Proceedings of ICDE*, 2004). However, none of these systems can query and process large scale structured content (e.g., millions of tables) for question answering like the techniques presented herein.

Another area associated with the database field is the research on keyword search in relational databases (e.g., V. Hristidis, L. Gravano, and Y. Papakonstantinou, Efficient ir-style keyword search over relational databases, In *VLDB*, 2003). However, the goal and the settings are substantially different from the web question answering systems and methods described herein, and hence those processes are not directly applicable.

There have been many attempts to extract structured information from the Web. The previous approaches (e.g., Agichtein and Gravano 2000) and, most recently, KnowItAll (see, Etzioni, Cafarella, Downey, Kok, Popescu, Shaked, Soderland, Weld, and Yates 2004) focus on extracting specific relationships (e.g., "is a"), which can then be used to answer the specific questions that these relationships support (e.g., "who is X"). In sharp contrast, the systems and methods herein facilitate question answering by finding, for example, the structured table(s) on the Web where the question was already answered. Unfortunately, many of the most useful tables do not contain optimum text patterns. By indexing most of the potentially useful structured content (e.g., tables), high coverage of user's questions can be achieved.

In recent developments, researchers have also looked to the Web as a resource for question answering (e.g., S. Buchholz, Using grammatical relations, answer frequencies and the world wide web for trec question answering, In *TREC*, 2001 and Kwok, Etzioni, and Weld 2001). These systems typically perform complex parsing and entity extraction for both queries and best matching Web pages and maintain local caches of pages or term weights. The systems and methods herein are sharply distinguishable from these by the fact that they explicitly target the structured content on the Web and forego the heavy processing required by other systems. In another approach, AskMSR (see, E. Brill, S. Dumais, and M. Banko, An analysis of the askmsr question-answering system, In *EMNLP*, 2002) focuses on the snippets returned by the search engine exploited redundancy for question answering. A key observation is that information in tables, like elsewhere on the Web, appears redundantly. Hence, correct answers are likely to appear together with question focus in multiple tables. However, because even invalid answers may appear many times on the Web, ranking the retrieved answer candidates is crucial.

There exist several machine learning methods for tackling the ranking problem, and there is an abundance of literature on ranking in the machine learning field. In one instance of the systems and methods herein, a recently introduced method for page ranking, RankNet (see, C. Burges, T. Shaked, E. Renshaw, A. Lazier, M. Deeds, N. Hamilton, and G. Hullender, Learning to rank using gradient descent, In *Proceedings of the Twenty Second International Conference on Machine Learning*, Bonn, Germany, 2005) is utilized. Comparison of RankNet with other ranking methods including PRank (see, K. Crammer and Y. Singer, On the algorithmic implementation of multiclass kernel-based vector machines, *Journal of Machine Learning Research*, 2:265-292, 2001), RankProp (see, R. Caruana, S. Baluja, and T. Mitchell, Using the future to "sort out" the present: Rankprop and multitask learning for medical risk evaluation, In D. S. Touretzky, M. C. Mozer, and M. E. Hasselmo, editors, *Advances in Neural Information Processing Systems*, volume 8, pages 959-965, The MIT Press, 1996) and OA-BPM (see, E. Harrington, Online ranking/collaborative filtering using the Perceptron algorithm, In *Proceedings of the Twentieth International Conference on Machine Learning*, 2003) can be found in Burges, Shaked, Renshaw, Lazier, Deeds, Hamilton, and Hullender 2005.

Question Answering Overview

Consider a natural language question "When was the telegraph invented." The ultimate goal of a question answering system is to retrieve a correct answer (e.g., "1844") from a document collection. Achieving this usually requires three main components: an information extraction engine for returning documents likely to contain the answers; a question analysis component for parsing the question, detecting the question focus, and converting a natural language question into a query for a search engine; and a query response component for analyzing the retrieved documents and determining the actual answers.

Despite recent progress, answer extraction (and ranking) remains the most challenging component of QA. Question answering systems use combinations of part of speech tagging, named entity recognition, and redundancy analysis and semantic analysis to guess the correct answer. Nevertheless, the problem is difficult, as it often requires sophisticated natural language understanding to detect the appropriate relationship between question focus and a candidate answer. However, the systems and methods presented herein, by exploiting the explicit structures created by the document authors, can implicitly obtain natural language understanding without additional cost and/or processing, and, hence, dramatically improve the applicability and scalability of question answering.

Framework and Query Model

Consider the previous example question "When was the telegraph invented." Invariably, someone (perhaps, a history buff) has created a list of all the major inventions and the corresponding years somewhere on the Web. Thus, it is assumed that every factoid question can be answered by some structured relationship. More specifically, in techniques utilized by the systems and methods herein, a question, denoted as $Q_{NL}$, is requesting an unknown value of an attribute of some relationship R, and provides one or more attribute values of R for selecting the tuples of R with a correct answer.

Therefore, to answer a question, the TQA model presented herein proceeds conceptually as follows (for this example, tables are utilized as an example of structured content available from the Web):

1. Retrieve all instances of R in the set of indexed tables $T_{ALL}$, denoted as $R_T$.
2. For each table $t \in R_T$, select the rows $t_i \in t$ that match the question focus $F_Q$.
3. Extract the answer candidates C from t*, the union of all selected rows.
4. Assign a score and re-rank answer candidates $C_i \in C$ using a scoring function Score that operates over the features associated with $C_i$.
5. Return top K answer candidates.

For example, R might be a relation InventionDate(Invention, Date), and a table snippet 502-506 in FIG. 5 is one of many instances of InventionDate on the Web. The selected rows in $R_T$ are those that contain the word "telegraph." With sufficient metadata and schema information for each table, this question can be answered by mapping it to a select-project query. More precisely, $Q_{NL}$ can be decomposed into two parts: the relationship specifier $M_Q$, for selecting the appropriate table by matching its metadata, and row specifier, $F_Q$, for selecting the appropriate row(s) of the matched tables. Unfortunately, HTML tables on the Web rarely have associated metadata or schema information that could be used directly. Hence, appropriate tables and rows are found by approximate search using the available information described infra.

TQA System Architecture

Figure 6:
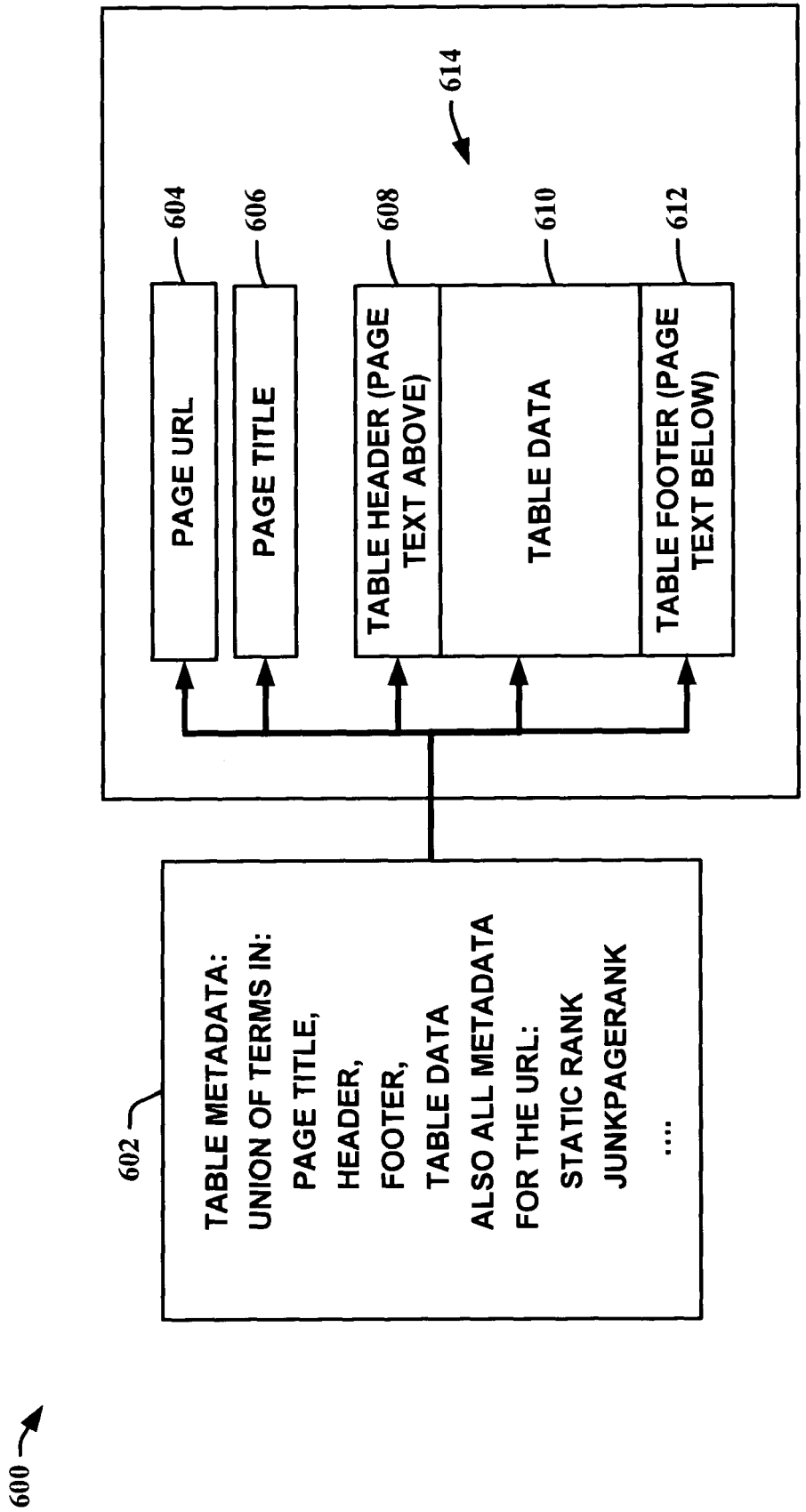
FIG. 6 is an illustration of an example of structured content metadata in accordance with an aspect of an embodiment.

As described supra, TQA first extracts promising tables (i.e., structured content) from the Web (e.g., table data 610 from example 600), and indexes them with available metadata which, for example, consists of the surrounding text on the page 608, 612, page title 606, and/or the URL of the originating page 604 and the like as shown in example 600 of FIG. 6. More specifically, each table t 614 is associated with a set of keywords that appear in the header 608, footer 612, and title 606 and the like associated with the table 614. Additionally, by storing the URL of the source page 604, static rank (see 602) and other information can also be stored about the source page.

Once the tables (i.e., structured content) are indexed, they can be used for answering questions. As described supra, some instances of the systems and methods herein can be employed without indexing the structured content. In these instances, the extracted data is utilized directly to determine answers to a query. To facilitate the performance at index time (for scalability) and/or at runtime (for throughput), the processing time required for each is typically balanced.

Figure 7:
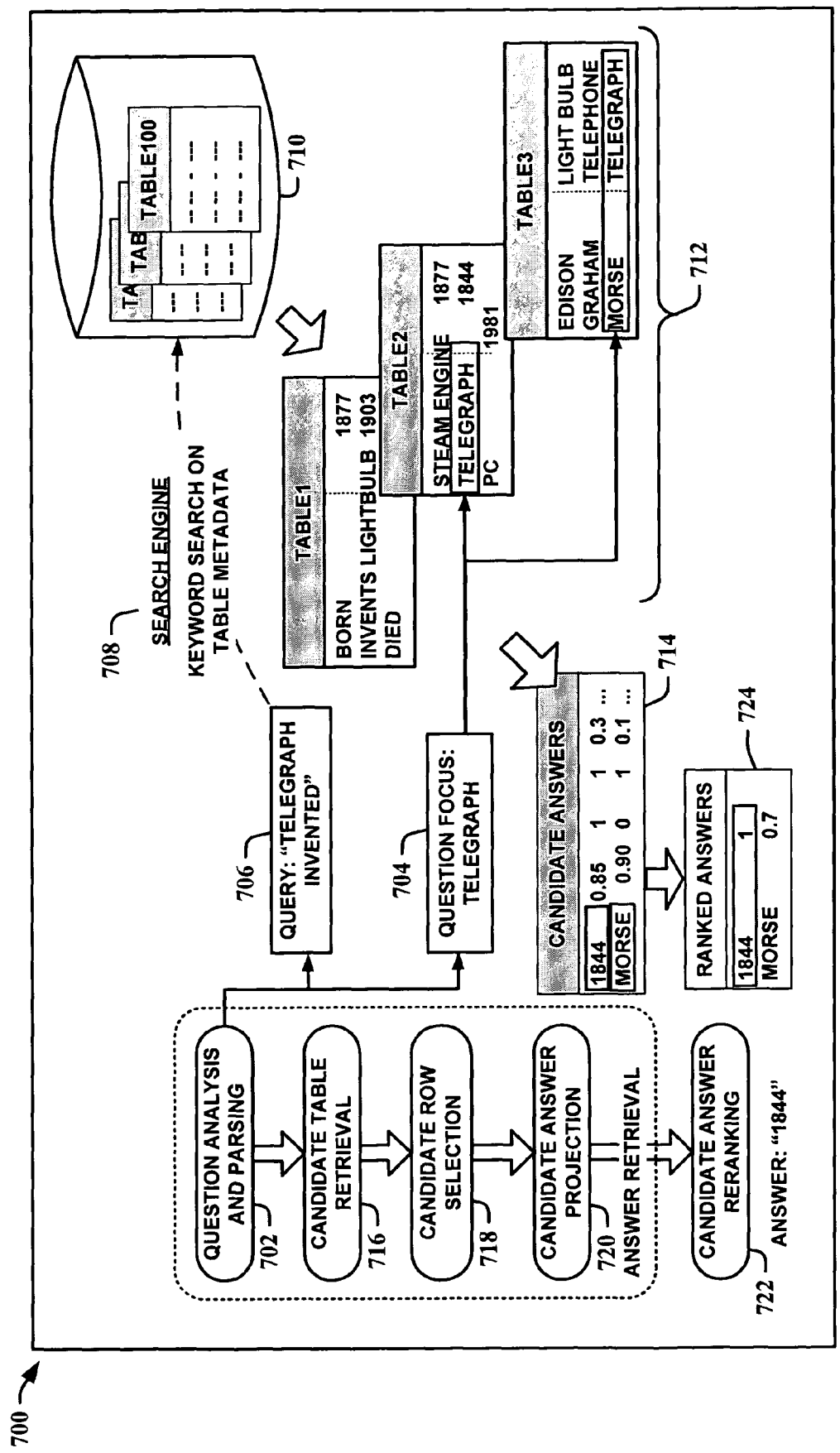
FIG. 7 is an illustration of an example architecture for structured web content query answering in accordance with an aspect of an embodiment.

A TQA question-answering architecture example 700 is illustrated in FIG. 7. Initially, a question is parsed 702 and annotated with the question focus 704, answer type, and converted to a keyword query 706. The query 706 is then submitted to the search engine 708 over the metadata information 710 described above. In one instance, the selected search engine employed is Lucene (available at http://www.openlucene.net/). The metadata information 710 is indexed as regular text keywords, and the actual table content is stored as a "non-indexed" text blob. Within each table 712 returned by the search engine (during candidate table retrieval 716), rows are searched to find those that contain the question focus 704 (candidate row selection 718). These rows are parsed and candidate answers 714 are extracted (candidate answer projection 720).

The candidate answer strings are filtered to match the answer type. For each surviving candidate answer string, a feature vector is constructed describing, for example, the source quality, closeness of match, frequency of the candidate and/or other characteristics of the answer and/or the source tables from which it was retrieved. The answer candidates are then re-ranked (see infra), and the top K answers are returned as the output of the overall system 722, 724.

Answer Retrieval Algorithm

The TQA answer retrieval procedure is outlined in Algorithm 1 below:

---

ALGORITHM 1: Candidate answer retrieval for question $Q_{NL}$, question focus $F_Q$, and answer type $T_A$ using search engine SE

---

```
Algorithm RetrieveAnswers( Q_NL, F_Q, T_A, SE, MR )
  //Convert question into keyword query
  Query = RemoveStopwords( Q_NL );
  //Retrieve at most MR tables by matching
  R_T = RetrieveCandidateTables(SE, Query, MR )
  Candidates = ( ) ;
  foreach t in R_T do
    foreach row r in t do
      if r does not match F_Q then
        continue;
      end
      foreach field f in r do
        //Store source and other statistics for each candidate
        if IsTypeMatch( T_A, f ) then
          AddCandidateAnswer(Candidates, f , r , t , f )
        end
        //Add token sequences in f shorter than Max words
        foreach sequence s in Subsequences( f , Min, Max) do
          if IsTypeMatch( T_A, f ) then
            AddCandidateAnswer(Candidates, s , r , t , f )
          end
        end
      end
    end
  end
  //Encode candidate answer and source information as features
```

---

-continued

ALGORITHM 1: Candidate answer retrieval for question $Q_{NL}$, question focus $F_Q$, and answer type $T_A$ using search engine SE

---

```
DecoratedCandidates =DecorateCandidateAnswers(Candidates)
return DecoratedCandidates
```

---

As the first step of the RetrieveAnswers, the question $Q_{NL}$ is converted into keyword query "Query." In one instance, the implementation removes stopwords, leaving the rest of the terms intact. However, other techniques can be incorporated in the employed query reformulation techniques (see, E. Agichtein, S. Lawrence, and L. Gravano, Learning to find answers to questions on the web, *ACM Transactions on Internet Technology (TOIT)*, 2004 and Brill, Dumais, and Banko 2002). Query is issued to the search engine SE to retrieve the matching tables as $R_T$.

For each returned table t in $R_T$, and for each row r of t, the question focus $F_Q$ is checked to see if it matches r (in an actual implementation, it is not necessary to check every row, but it is described here for the sake of clarity). If yes, the row is selected for further processing. The matched rows are then parsed into fields according to the normalized HTML field boundaries. To generate the actual answer candidates, each field value f in r is considered as a candidate, as well as all sequences of tokens in each f. If a candidate substring matches the answer type $T_A$, the candidate is added to the list of Candidates. For each candidate answer string, the list of source tables, rows, positions, and other statistics are maintained, which are used for re-ranking the answers to select top K most likely correct ones, described infra.

Decorating Answers with Features for Ranking

There are often incorrect answers returned, in addition to correct ones. In order to return the correct answers, they have to be re-ranked. For this, each answer candidate is decorated with a set of features that are designed to separate correct answers from incorrect ones. The features are of two types: (a) source features (i.e., properties of the source page, table, and how the candidate appeared in the table) and (b) answer type features (i.e., intrinsic properties of the actual answer string).

Example features used for ranking answers are listed in TABLE 1 below. Note that many more features are available and can be incorporated for the ranking, and the list below is only for illustration purposes. To generate the features for each candidate answer, standard natural language processing tools are utilized, namely, a Named Entity tagger, Porter stemmer, and simple regular expressions that correspond to the type of expected answer. Additionally, the debugging information provided by the search engine (e.g., the Static link-based rank value of the source URL of a table) is incorporated.

TABLE 1

Example features used for candidate answer ranking

| FeatureName | Type | Weight | Description |
| --- | --- | --- | --- |
| Frequency | answer | 1 | Number of times answer candidate was seen |
| FrequencyDecayed | answer | 1 | Frequency weighted by search rank |
| IDF | answer | 1 | The Inverse Document Frequency of the answer string on the web |

TABLE 1-continued

Example features used for candidate answer ranking

| FeatureName | Type | Weight | Description |
|---|---|---|---|
| TF | answer | 1 | The Term Frequency over all retrieved tables for the question |
| TypeSim | answer | 100 | Is 1 if the answer is recognized as a Named Entity (if applicable) |
| TableSim | source | 300 | Average Cosine similarity between the query and table metadata |
| RowSim | source | 50 | Average Cosine similarity between the query and row text terms |
| PageRank | source | 1 | Average PageRank value of the source page |
| ColumnPos | source | 1 | Average column distance of answer and question focus |
| AnswerTightness | source | 50 | Average fraction of source field tokens taken by answer |
| FocusTightness | source | 50 | Average fraction of source field taken by question focus |
| QueryOverlap | answer | −200 | Fraction of tokens shared by the answer string and the query |
| StemOverlap | answer | −200 | Fraction of token stems shared by the answer string and the query |
| NumSources | answer | 1 | Number of supporting source tables |
| Length | answer | 1 | Length of the answer string in bytes |
| NumTokens | answer | 1 | Number of tokens in the answer string |

Re-Ranking Candidate Answers

Ranking candidate answers is a challenging task of web question answering. Typically, among many thousands of candidates returned, there are only a handful of correct answers. Below two specific probabilistic ranking methodologies are described. Alternatively, heuristic (i.e., human-tuned) ranking can be used, or a combination of probabilistic, heuristic, and personalized ranking functions. While this implementation included probabilistic and heuristic methods, other variations and combinations of ranking functions can also be utilized in this framework.

Probabilistic Re-Ranking—RankNet

Here, the RankNet algorithm is described briefly. More details can be obtained in Burges, Shaked, Renshaw, Lazier, Deeds, Hamilton, and Hullender 2005. The technique is to use a cost function that captures the posterior probability that one item is ranked higher than another: thus, the training data takes the form of pairs of examples with an attached probability (which encodes the certainty that the assigned ranking of the pair is correct). For example, if there is no knowledge as to whether one item should be ranked higher than the other in the pair, a probability of one half can be assigned to the posterior for the pair, and the cost function then takes such a form that the model is encouraged to give similar outputs to those two patterns.

If it is likely that the first example is to be ranked higher than the second, the cost function penalizes the model by a function of the difference of the model's outputs for the two patterns. A logistic function is used to model the pairwise probabilities; a cross entropy cost is then used to compute the cost, given the assigned pairwise probabilities and given the model outputs for those two patterns. This cost function can be used for any differentiable ranking function; the authors of Burges, Shaked, Renshaw, Lazier, Deeds, Hamilton, and Hullender 2005 chose to use a neural network. RankNet is straightforward to implement (the learning algorithm is essentially a modification of back propagation) and has proven very effective on large scale problems.

Probabilistic Re-Ranking—Naive Bayes

The Naive Bayes model is a very simple and robust probabilistic model (see, for example, T. M. Mitchell, *Machine Learning*, McGraw-Hill, New York, 1997). Here Naive Bayes was used by treating the problem as a classification problem with two classes (relevant or not). The key assumption in Naive Bayes is that the feature conditional probabilities are independent, given the class. All probabilities can be measured by counting, with a suitable Bayesian adjustment to handle low count values. Since most of the features utilized by the systems and methods herein are continuous, bins (e.g., 100 bins), for example, can be utilized to quantize each feature. For both methods—RankNet and Naive Bayes—a 0-1 normalization is used (that is, values for a given feature for a given query were rescaled to lie in the range [0,1]).

The systems and methods described herein are scalable for large scale structured content (e.g., hundreds of millions of tables extracted from hundreds of millions of web pages), exploiting the extreme wealth found on the Web. Other instances can employ crawl-time techniques that focus the crawlers to structured content based sites to facilitate in enhancing the structured information extraction techniques. Yet other instances can be integrated with more traditional based question answering systems to provide a hybrid question answering model that can augment traditional type searches to enhance their performance when structured content is available. The question answering techniques provided supra are also not limited to the surface web. In fact, the "hidden" or "Deep" web also abounds in structured content. These techniques can be extended to allow searching and retrieving pages from the deep web, which can then be processed using systems and methods presented herein.

Typically, the structured content (e.g., table and/or table snippet and the like) is processed and stored in isolation. However, data integration techniques can be adapted to do more aggressive integration at crawl-time. Typical data integration techniques are not likely to scale to millions of data sources and billions of possibly useful tables. Thus, for specific tasks such as question answering, a combination of information retrieval and data integration techniques can be utilized, bridging the question answering, database, and data integration fields.

Figure 8:
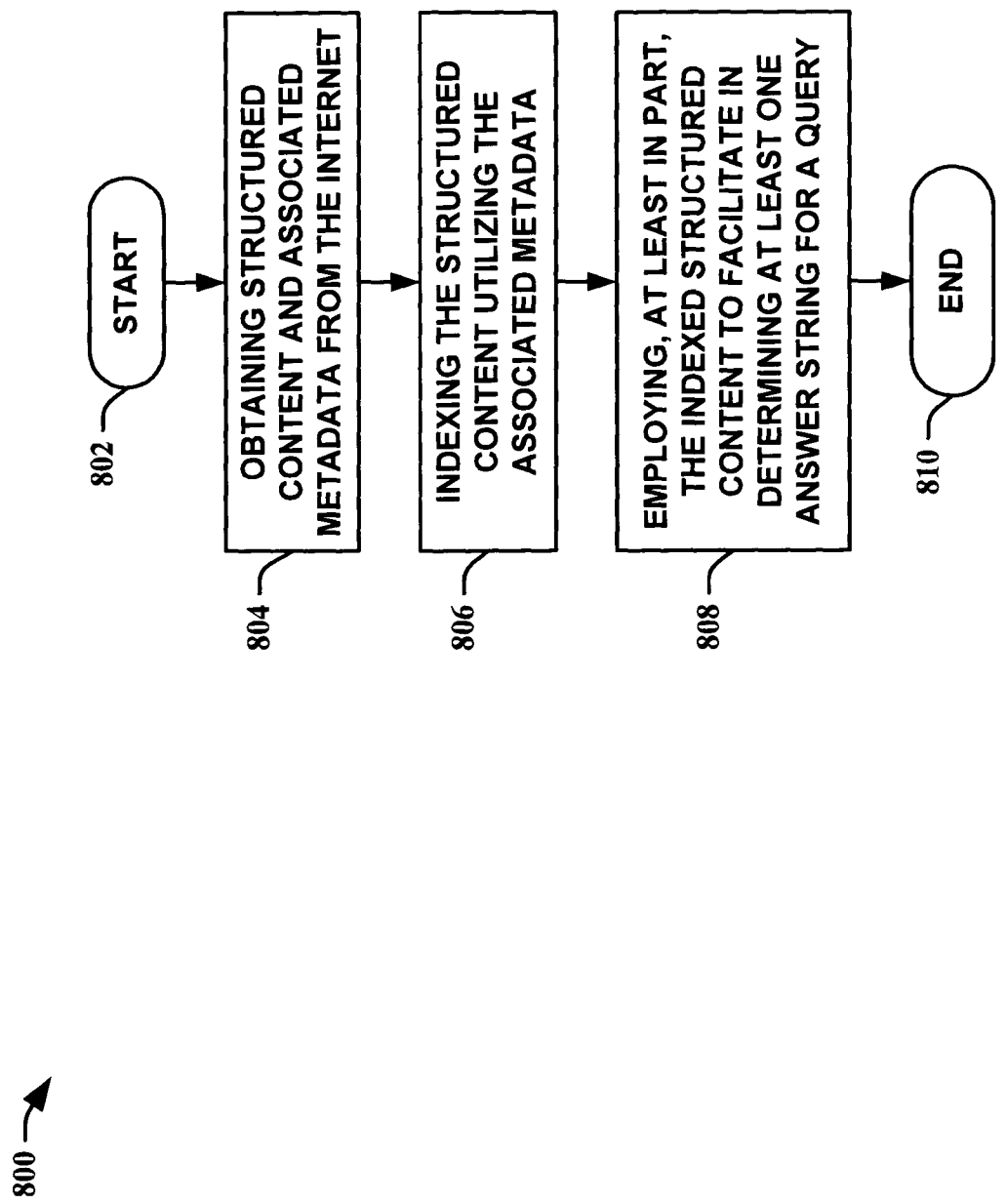
FIG. 8 is a flow diagram of a method of facilitating determination of search query answers in accordance with an aspect of an embodiment.
Figure 9:
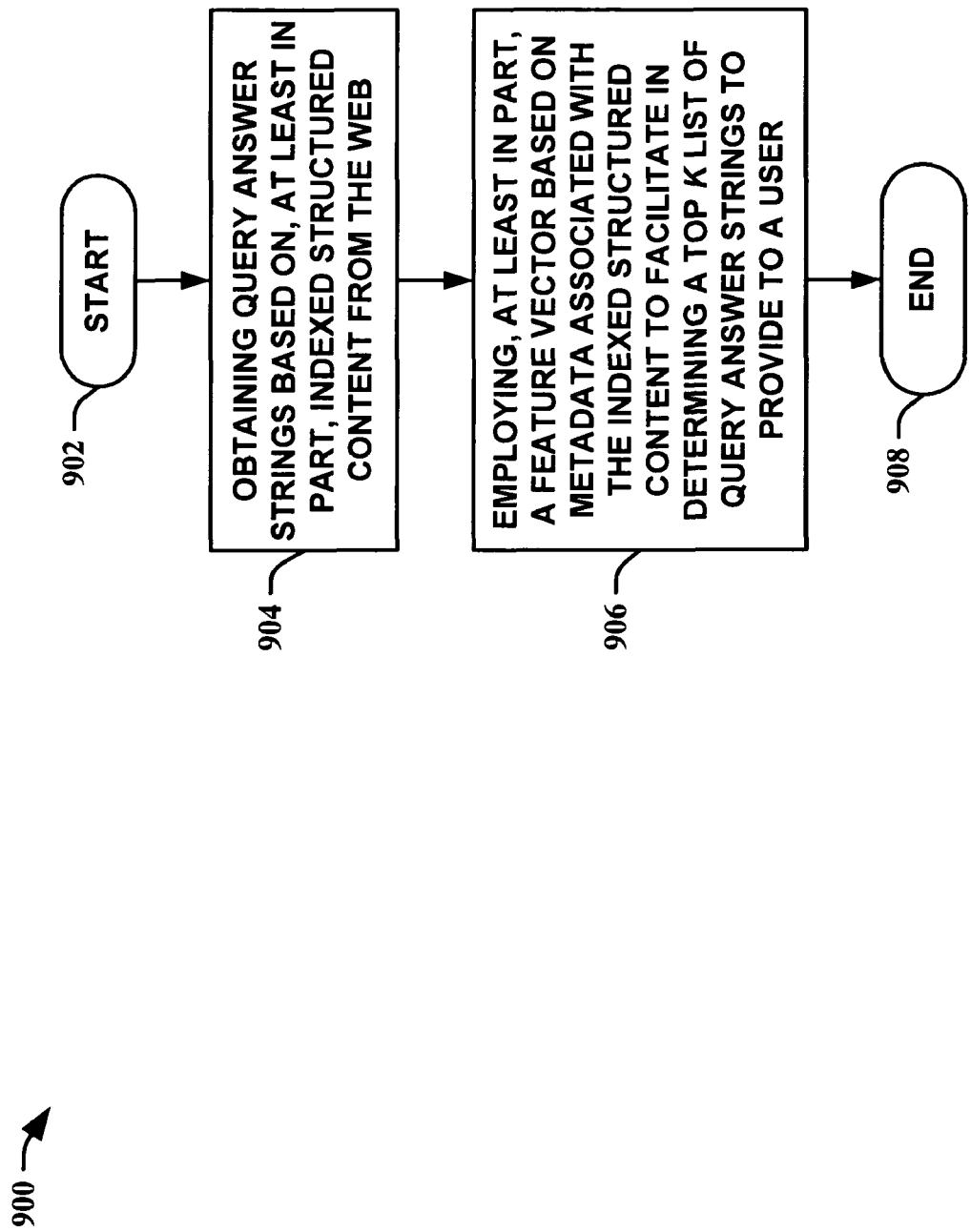
FIG. 9 is another flow diagram of a method of facilitating determination of search query answers in accordance with an aspect of an embodiment.
Figure 10:
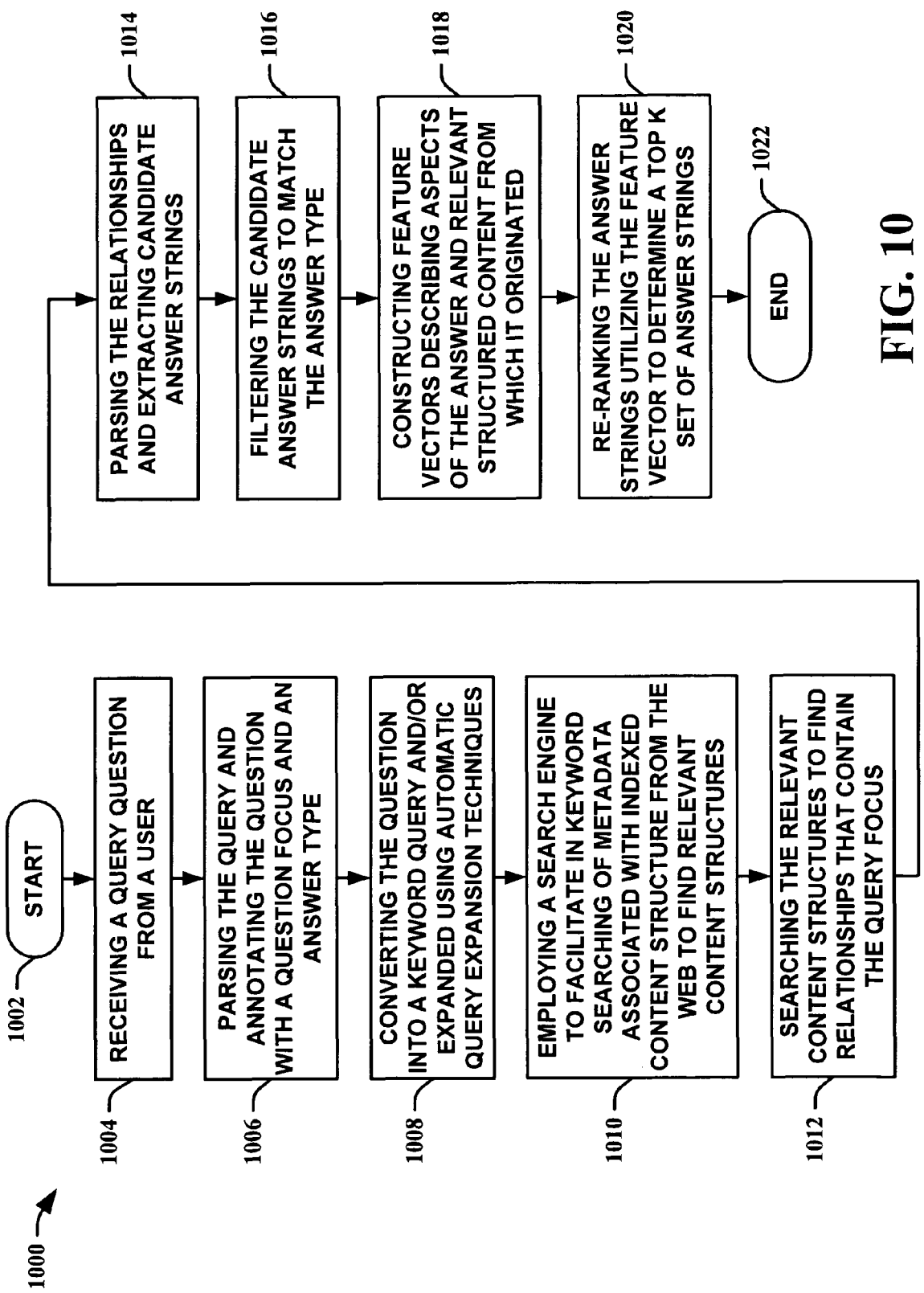
FIG. 10 is yet another flow diagram of a method of facilitating determination of search query answers in accordance with an aspect of an embodiment.

In view of the exemplary systems shown and described above, methodologies that may be implemented in accordance with the embodiments will be better appreciated with reference to the flow charts of FIGS. 8-10. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 8, a flow diagram of a method 800 of facilitating determination of search query answers in accordance with an aspect of an embodiment is shown. The method 800 starts 802 by obtaining structured content and associated metadata from the Internet 804. The structured content can be extracted from, for example, the Web and/or the deep/hidden Web as well. It can be obtained from local networks such as Intranets and/or wide area networks as well. The associated metadata can include, but is not limited to, textual information, graphical information, structured content structural information, source structural information, network information, and/or source metadata and the like. For example, it can include surrounding text on a web page, web page title, and/or URL of an originating web page of structured content and the like. It can also include, but is not limited to, network associated information relating to the web page (e.g., location of the web page, links to the web page, ranking of the web page, access data relating to the web page, etc.); anchor, header, and/or footer information for a structured content source; header and/or footer information for structured content; and/or other related information associated with the structured content and/or its originating source and the like. Other types of information for the metadata can also include, but are not limited to, highlights, colors, structure of the Web, structure of the structured content (e.g., number of rows and/or columns of a table, etc.), spatial information, and/or graphical items/structures and the like.

The structured content is then indexed utilizing the associated metadata 806. The associated metadata is utilized to facilitate in indexing the structured data. This is typically accomplished at crawl-time after the extraction of the structured content and associated metadata. The indexing can utilize, for example, keywords associated with the structured content (e.g., keywords from a table header, footer, and/or web page text, title, etc. associated with the table). The indexed structured content is then employed, at least in part, to facilitate in determining at least one answer string for a query 808, ending the flow 810. The query is typically parsed into key search terms which are then applied to the indexed structured content. Relevant structured content is then searched to determine candidate answer strings that are provided to a user. The provided response can include a single answer string or multiple answer strings.

Looking at FIG. 9, another flow diagram of a method 900 of facilitating determination of search query answers in accordance with an aspect of an embodiment is illustrated. The method 900 starts 902 by obtaining query answer strings based on, at least in part, indexed structured content from the Web 904. The indexed structured content and answer strings can be obtained and determined as described supra. A feature vector based on metadata associated with the indexed structured content is then employed, at least in part, to facilitate in determining a top k list of query answer strings to provide to a user 906, ending the flow 908. The feature vector is constructed over the metadata for the structured content. Because any aspect of the structured content and associated information can be utilized to form the feature vector, the method 900 is extremely flexible and can be finely tuned for specific situations to enhance performance. The feature vector is employed to determine which answer strings have a feature set that most closely matches the feature vector. The best candidates are then returned to a user in response to the query as the top K best responses.

Turning to FIG. 10, yet another flow diagram of a method 1000 of facilitating determination of search query answers in accordance with an aspect of an embodiment is depicted. The method 1000 starts 1002 by receiving a query question from a user 1004. The question itself can be, for example, a natural language question or an information-seeking query and the like. The query is then parsed and annotated with a query focus and an answer type 1006 (e.g., "year," etc.). The query focus can be manually provided such as, for example, by the user and/or automatically detected such as, for example, by a system. The question is then converted into a keyword query and/or expanded using automatic query expansion techniques 1008. A search engine is employed to facilitate in keyword searching of metadata associated with indexed content structure from the Web to find relevant content structures 1010. The relevant content structures are then searched to find relationships that contain the query focus 1012. For example, a table inherently has relationships based on columns and rows. Thus, each row contains possible answer strings that can be extracted. The relationships are then parsed and candidate answer strings are extracted 1014. The candidate answer strings are filtered to match the answer type 1016 (e.g., all answer strings that are in a "year" format). Feature vectors describing aspects of the answer and relevant structured content from which it originated are constructed 1018. The feature vectors can be constructed from any aspect and, thus, afford substantial flexibility for enhancing and tuning performance. The answer strings are re-ranked utilizing the feature vector to determine a top K set of answer strings 1020, ending the flow 1022. The answer strings themselves comprise a set of features that are compared to the feature vector to facilitate in determining the ranking of the answer lists.

Figure 11:
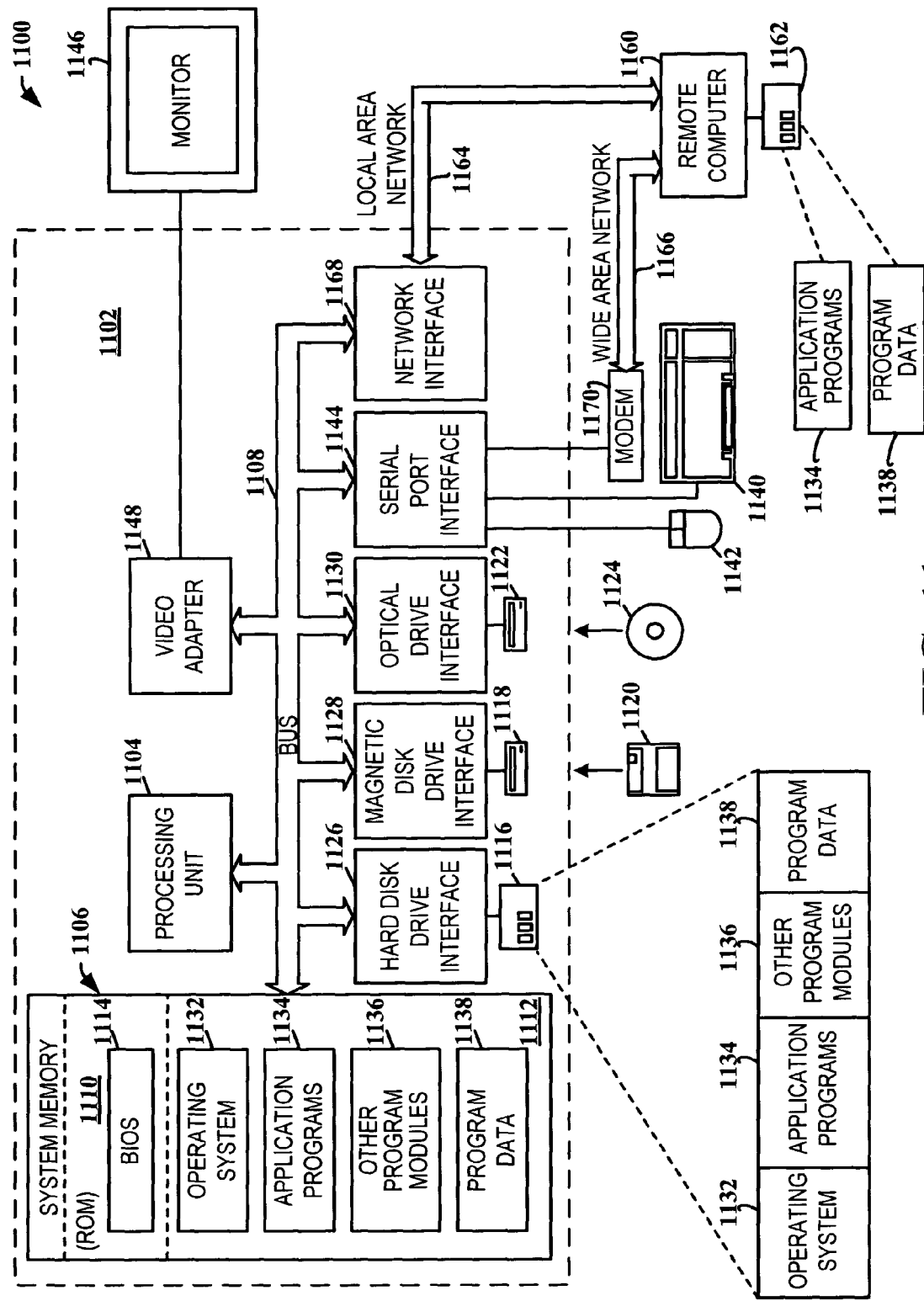
FIG. 11 illustrates an example operating environment in which an embodiment can function.

In order to provide additional context for implementing various aspects of the embodiments, FIG. 11 and the following discussion is intended to provide a brief, general description of a suitable computing environment 1100 in which the various aspects of the embodiments may be implemented. While the embodiments have been described above in the general context of computer-executable instructions of a computer program that runs on a local computer and/or remote computer, those skilled in the art will recognize that the embodiments may also be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, handheld computing devices, microprocessor-based and/or programmable consumer electronics, and the like, each of which may operatively communicate with one or more associated devices. The illustrated aspects of the embodiments may also be practiced in distributed computing environments where certain tasks are performed by remote processing devices that are linked through a communications network. However, some, if not all, aspects of the embodiments may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 11, an exemplary system environment 1100 for implementing the various aspects of the embodiments include a conventional computer 1102, including a processing unit 1104, a system memory 1106, and a system bus 1108 that couples various system components, including the system memory, to the processing unit 1104. The processing unit 1104 may be any commercially available or proprietary processor. In addition, the processing unit may be implemented as multi-processor formed of more than one processor, such as may be connected in parallel.

The system bus 1108 may be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1110 and random access memory (RAM) 1112. A basic input/output system (BIOS) 1114, containing the basic routines that help to transfer information between elements within the computer 1102, such as during start-up, is stored in ROM 1110.

The computer 1102 also may include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1100, and further that any such media may contain computer-executable instructions for performing the methods of the embodiments.

A number of program modules may be stored in the drives 1116-1122 and RAM 1112, including an operating system 1132, one or more application programs 1134, other program modules 1136, and program data 1138. The operating system 1132 may be any suitable operating system or combination of operating systems. By way of example, the application programs 1134 and program modules 1136 can include a query answering scheme in accordance with an aspect of an embodiment.

A user can enter commands and information into the computer 1102 through one or more user input devices, such as a keyboard 1140 and a pointing device (e.g., a mouse 1142). Other input devices (not shown) may include a microphone, a joystick, a game pad, a satellite dish, a wireless remote, a scanner, or the like. These and other input devices are often connected to the processing unit 1104 through a serial port interface 1144 that is coupled to the system bus 1108, but may be connected by other interfaces, such as a parallel port, a game port or a universal serial bus (USB). A monitor 1146 or other type of display device is also connected to the system bus 1108 via an interface, such as a video adapter 1148. In addition to the monitor 1146, the computer 1102 may include other peripheral output devices (not shown), such as speakers, printers, etc.

It is to be appreciated that the computer 1102 can operate in a networked environment using logical connections to one or more remote computers 1160. The remote computer 1160 may be a workstation, a server computer, a router, a peer device or other common network node, and typically includes many or all of the elements described relative to the computer 1102, although for purposes of brevity, only a memory storage device 1162 is illustrated in FIG. 11. The logical connections depicted in FIG. 11 can include a local area network (LAN) 1164 and a wide area network (WAN) 1166. Such networking environments are commonplace in offices, enterprise-wide computer networks, intranets and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, or is connected to a communications server on the LAN, or has other means for establishing communications over the WAN 1166, such as the Internet. The modem 1170, which can be internal or external relative to the computer 1102, is connected to the system bus 1108 via the serial port interface 1144. In a networked environment, program modules (including application programs 1134) and/or program data 1138 can be stored in the remote memory storage device 1162. It will be appreciated that the network connections shown are exemplary and other means (e.g., wired or wireless) of establishing a communications link between the computers 1102 and 1160 can be used when carrying out an aspect of an embodiment.

In accordance with the practices of persons skilled in the art of computer programming, the embodiments have been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1116, floppy disks 1120, CD-ROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

Figure 12:
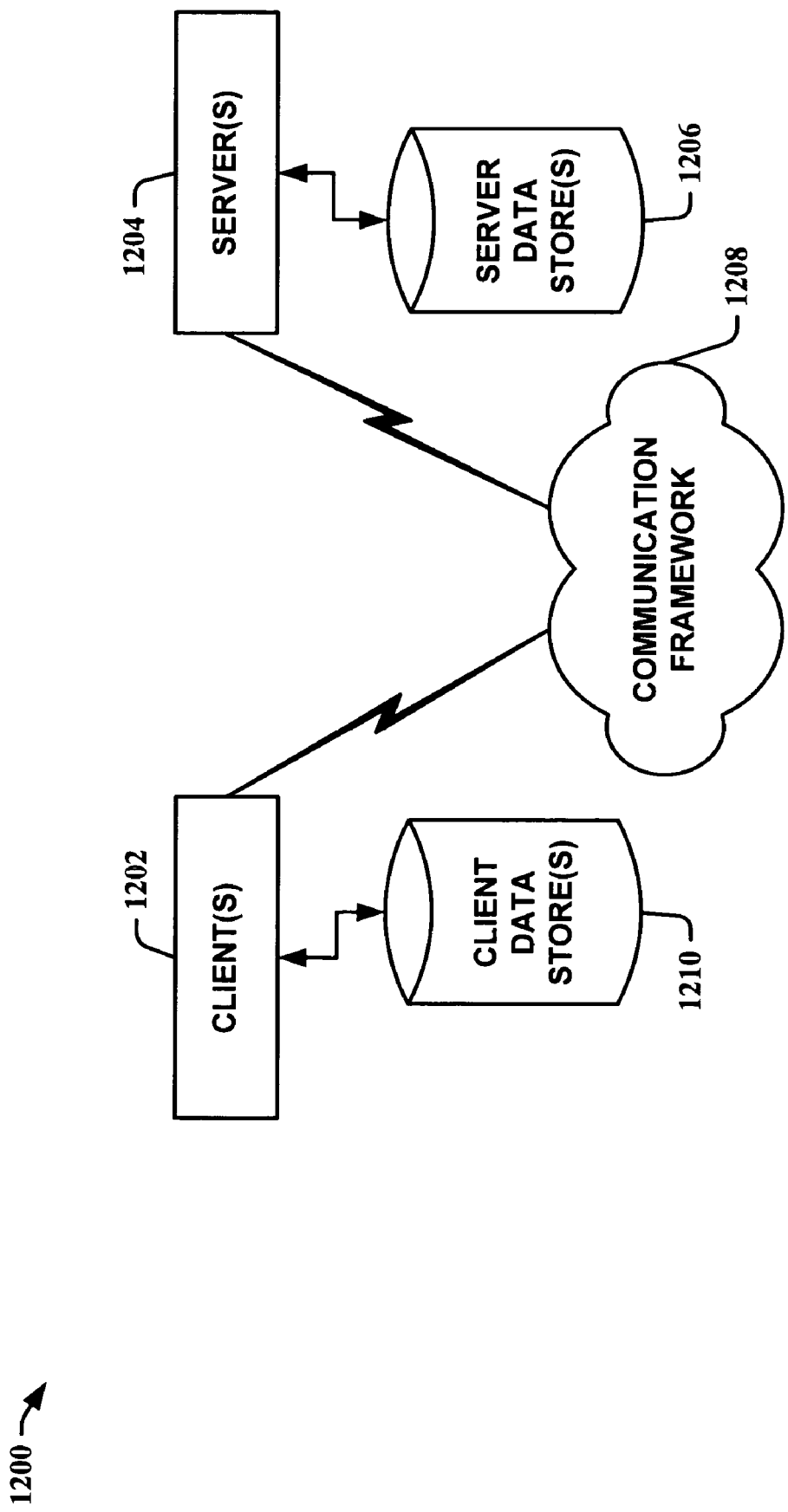
FIG. 12 illustrates another example operating environment in which an embodiment can function.

FIG. 12 is another block diagram of a sample computing environment 1200 with which embodiments can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 may be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

It is to be appreciated that the systems and/or methods of the embodiments can be utilized in a query answering facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates determination of search query answers, comprising:
    a processor that executes computer executable components stored in a memory:
    an extraction component that crawls content located via multiple sources on a network and obtains, at crawl-time, structured content along with associated metadata;
    an indexing component that indexes the structured content from the extraction component based at least on the associated metadata, and stores the indexed structured data in a database;
    a query response component that employs the indexed structured content to determine a plurality of query answer strings in response to receiving a user query, wherein the query response component:
    parses the user query to ascertain a question focus and an answer type;
    searches the indexed structured content stored in the database for the question focus and identifies the plurality of query answer strings that conform with the answer type in accordance with one or more relationships specified by the obtained structured content; and
    provides feature information included in a feature vector for each of the plurality of query answer strings, wherein the feature information includes a set of features that describe characteristics of an answer, the set of features including at least one source feature relating to a source from which a particular string of information was extracted, and at least one answer type feature relating to an intrinsic property of an actual query answer string; and
    a ranking component that utilizes the feature vectors to automatically order a top K number of query answer strings, where K is an integer from one to a total number of available query answer strings.

2. The system of claim 1, wherein the set of features include:
    a source quality;
    a closeness of a match; and
    a frequency of an answer candidate.

3. The system of claim 1, wherein the query response component further employs personalized data to determine the plurality of query answer strings.

4. The system of claim 3, wherein the query response component obtains the personalized data on at least one of a remote or local data server.

5. The system of claim 1, wherein the feature vectors are representative of characteristics of a desired query answer string.

6. The system of claim 1, wherein the ranking component ranks the query answer strings to facilitate the query response component in determining at least one most likely user desirable query answer string.

7. The system of claim 6, wherein the automatically trained ranking component employs training data to facilitate in determining query answer string rank.

8. The system of claim 7, wherein the training data comprises at least one of user provided data or feature data associated with at least one correct desired query answer string, obtained for previous queries.

9. The system of claim 1, wherein the associated metadata comprises network related information that is associated with the structured content.

10. The system of claim 1, wherein the associated metadata comprises at least one of page or site-related information that is associated with the structured content.

11. A computer-implemented method for facilitating determination of search query answers, comprising:
    employing a processor executing computer-executable instructions stored on a computer-readable storage medium to implement the following acts:
    extracting structured content and associated metadata from a plurality of web pages on the Internet at crawl-time, wherein the structured content includes tables that specify relationships between strings of information;
    indexing the structured content utilizing the associated metadata;
    storing the indexed structured content in a database;
    obtaining a query from at least one user;
    ascertaining a question focus and an answer type based upon the obtained query;
    searching the indexed structured content stored in the database based upon the question focus;
    identifying a plurality of candidate answer strings for the query based upon one or more relationships specified by the indexed structured content, wherein the one or more relationships include the question focus such that the plurality of candidate answer strings conform to the answer type;
    providing feature information included in a feature vector for each of the plurality of candidate answer strings, wherein the feature information includes a set of features that describe characteristics of an answer, the set of features including at least one source feature relating to a source from which a particular candidate answer string was extracted, and at least one answer type feature relating to an intrinsic property of the particular candidate answer string;
    ranking the candidate answer strings based on the feature vectors; and
    providing the ranked candidate answer strings to the at least one user.

12. The method of claim 11, the set of features include:
    a source quality;
    a closeness of a match; and
    a frequency of an answer candidate.

13. The method of claim 11 further comprising:
employing a trainable ranking process to facilitate ranking of the candidate answer strings.

14. The method of claim 13 further comprising:
utilizing at least one of personalized or localized data to facilitate training the ranking of the candidate answer strings.

15. The method of claim 11 further comprising:
employing a probabilistic ranking model to facilitate in determining an order of the candidate answer strings.

16. A device employing the method of claim 11 comprising at least one selected from the group consisting of a computer, a server, and a portable electronic device.

17. A computer-implemented system that facilitates determination of search query answers, comprising:
at least one processor that executes computer executable code stored in memory:
means for extracting structured content from a plurality of web pages on the Internet along with associated metadata, wherein the structured content is extracted at an Internet crawl-time and includes at least one list that provides relationships between strings of information that facilitates formation of an answer string;
means for indexing the structured content based at least on the associated metadata;
means for storing indexed structured content at a database;
means for obtaining a query from a user;
means for determining a question focus of the query and an answer type for the query;
means for searching the indexed structured content stored at the database based upon the question focus;
means for identifying a plurality of candidate answer strings for the query based upon one or more relationships specified by the indexed structured content, wherein the one or more relationships include the question focus such that the plurality of candidate answer strings conform to the answer type;
means for providing feature information included in a feature vector for each of the plurality of candidate answer strings, wherein the feature information includes a set of features that describe characteristics of an answer, the set of features including at least one source feature relating to a source from which a particular candidate answer string was extracted, and at least one answer type feature relating to an intrinsic property of the particular candidate answer string; and
means for ranking the candidate answer strings based on the feature vectors.

18. The computer-implemented system of claim 17, wherein the set of features include:
a source quality;
a closeness of a match; and
a frequency of an answer candidate.

* * * * *